May 19, 1931. J. F. MAKOWSKI 1,805,990
CONDUIT ASSEMBLY
Filed July 20, 1929

INVENTOR
J. F. Makowski
BY
ATTORNEY

Patented May 19, 1931

1,805,990

UNITED STATES PATENT OFFICE

JOHN F. MAKOWSKI, OF OAKLAND, CALIFORNIA, ASSIGNOR TO FIREPROOF WALL COMPANY, OF RENO, NEVADA, A CORPORATION OF NEVADA

CONDUIT ASSEMBLY

Application filed July 20, 1929. Serial No. 379,813.

This invention relates to underground conduits of various kinds such as cable conduit, sewer pipe, water pipe, etc. Such conduits are usually made up of relatively short lengths or sections so that they may be easily handled, and usually a plurality of such conduits are arranged in closely associated order, particularly when provided for use as cable conduits where it is desired to carry a considerable number of cables in separated relation to each other but within a relatively small cross-sectional area.

In laying conduits of this character, particularly the cable conduits, it is customary to first excavate a trench and place the conduits therein in transversely alined and superimposed order. This is usually done by first laying one course of the conduits and then pouring concrete over the same (or sometimes sand or cinders are filled around the same); then this process is repeated for succeeding courses until the total structure is completed. Under this method there is a tendency for the conduit sections to roll or float or to be otherwise disturbed when the concrete is poured so that they become shifted out of proper alinement and possibly separated from each other. This is a condition which should of course not be permitted to occur and it requires considerable care and expense to avoid the same.

The principal object of my invention is to avoid the above annoying and expense creating feature by assembling the conduits with each other in such a manner that they are all automatically interlocked with each other as they are laid. Such interlocking not only functions to lock the different conduits but the individual sections of each conduit as well. This arrangement therefore eliminates the possibility of any individual conduit floating or getting out of place, since when held together as a unit the total weight is sufficient to offset whatever buoyancy an individual section may have. Not only is the undesirable floating tendency eliminated but this is accomplished at no additional expense over that of the conduits and the necessary couplings themselves; and to assemble the conduits in my improved manner takes no longer than to couple and lay the conduits as has always been previously done.

In carrying out my invention I make use as a necessary adjunct the special type of coupling collar shown and particularly described in my copending application for patent, Serial No. 379,812, filed July 20, 1928.

These objects I accomplish by means of such structure and relative arrangement of parts as will fully appear by a perusal of the following specification and claims.

In the drawings similar characters of reference indicate corresponding parts on the several views.

Figure 1:
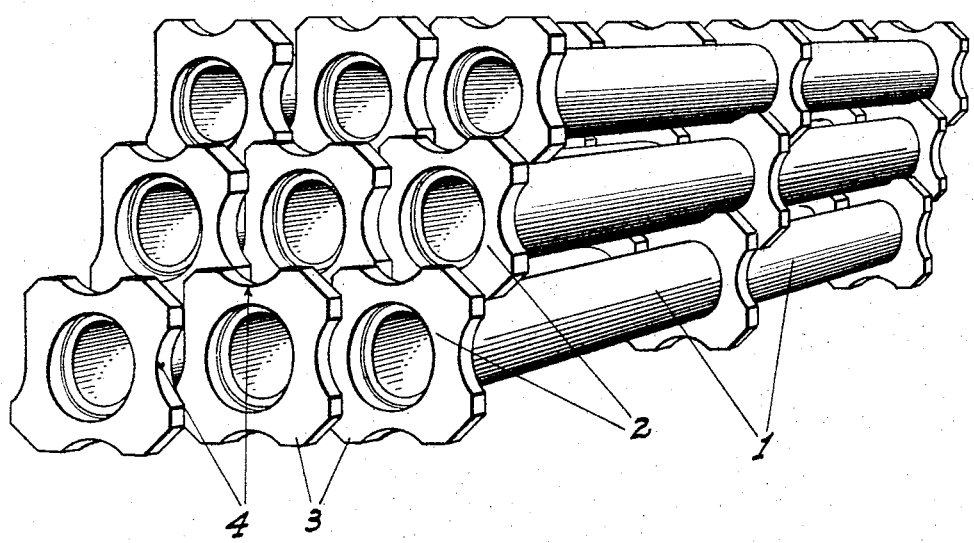
Fig. 1 is a perspective view of a conduit assembly showing the improved manner of arranging the individual conduits relative to each other to attain the desired end.
Figure 2:
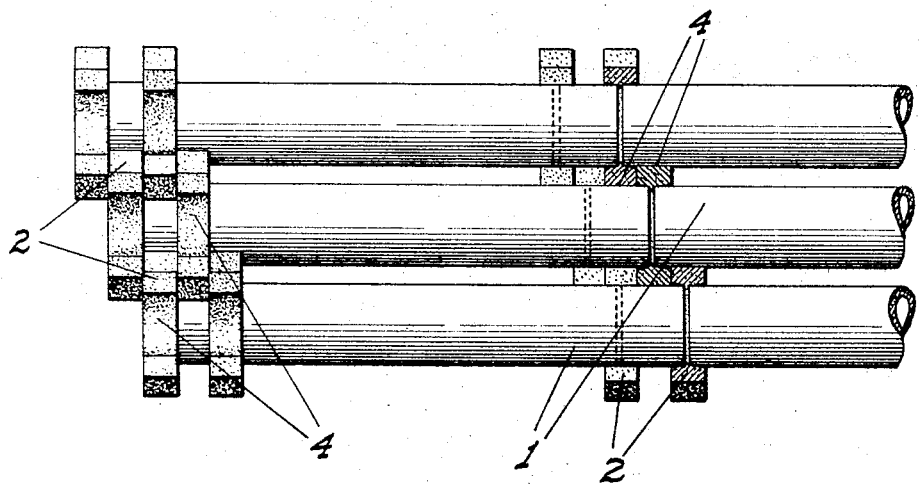
Fig. 2 is a top plan view of a pair of superimposed courses of conduits to better illustrate the interlocking and joint breaking or offset feature.

Referring now more particularly to the characters of reference on the drawings, each conduit comprises a number of individual tubular or cylindrical sections 1.

The sections are connected at their adjacent ends by coupling collars 2 into which the ends of the sections fit and which are of the type set forth in the said above mentioned copending application. The exterior periphery of these collars is formed with circumferentially spaced lugs 3 so as to engage the ground in a stable and non-rolling relation; and also with concave depressions 4 intermediate the lugs disposed 90° apart and corresponding in shape to the external periphery of the conduits. This enables the collars to provide both side interlocking or embracing and top or bottom engagement with adjacent conduits.

Assuming that the conduit is laid in three superimposed courses, each course consisting of a row of three transversely spaced conduits as shown in the drawings the manner of assembling such conduits is as follows:—

The bottom row or course is laid with the collars at the ends of the different sections, the conduits being placed so that the ends or joints of the sections are transversely and symmetrically offset to an extent not less than the thickness of the collar, and sufficiently close so that the collar on one conduit will closely engage and of course partially embrace the side of an adjacent conduit. The joints being thus broken or offset at one point, the same extent of offset is maintained throughout the length of the conduit since the length of all the sections of which said conduit is built up is the same.

The sections of the course above are similarly provided with collars which engage the corresponding conduits below so as to form supporting saddles while the upper course of conduits is also engaged by the collars of the conduits below, which lower collars therefore form cradles. The side engagement or embracing of the collars of the second course with the other conduits in the same course is also had as in the above course.

Further while the extent of offset of the ends of the conduit sections of the second course is the same as that of the course below, the planes of offsetting are not in vertical alinement with each other. This is because the collars of the conduits of the second course cannot be superimposed on the collars of the first course but must be beyond the same in one direction or the other in order to avoid interference and to enable said collars to seat on the conduits below. The ends of the conduit sections are of course also longitudinally offset from the corresponding ends of the sections below.

Similarly the joints of the sections of the uppermost course, the conduits of which are similarly laid on the second course, are longitudinally offset from those of the course directly below as well as from those of the lowermost course. As a result it will be seen that all the individual conduits and their component sections are so interconnected as to form a self-supporting structure. It will also be seen that any lifting pressure applied to any lowermost conduit section is transmitted not only to the adjacent sections of the same conduit but to the other conduits in the same course and all the others above as well. In other words before any one conduit could float or be dislodged the lifting pressure on said conduit would have to be sufficient to raise or dislodge the other conduits. The buoyancy of the conduit material however is not sufficient for the concrete when being poured to effect this result and as a consequence the structure remains immovable when the concrete is thus poured and the trench is filled in.

The nesting of the sections and joining all the collars and sections together in a compact form so interlocks the same that I have found in actual practice that instead of being compelled to lay the conduits in courses and filling the concrete in around each course as laid, that the entire assembly may be put together and the concrete poured over the same as an entirety and at one operation. It will be obvious that this will be a great saving in time and will permit of a much greater efficiency being attained in the structural arrangement of the assembled conduits.

From the foregoing description it will be readily seen that I have produced such a structure as substantially fulfills the objects of the invention as set forth herein.

While this specification sets forth in detail the present and preferred construction of the structure, still in practice such deviations from such detail may be resorted to as do not form a departure from the spirit of the invention, as defined by the appended claims.

Having thus described my invention what I claim as new and useful and desire to secure by Letters Patent is:

1. A conduit assembly including individual transversely separated conduits, each conduit comprising separate longitudinally alined sections, a member common to adjacent sections of a conduit at the joint between the same for connecting said sections together and means formed with said member to locate adjacent conduits in definitely spaced relation and preventing movement of one relative to the other.

2. A conduit assembly including individual transversely separated conduits, each conduit comprising separate longitudinally alined sections, one conduit being arranged with the joints between its sections transversely offset from the joints of the other conduit, and coupling collars about each conduit at the different section joints and connecting the sections together; each collar being arranged to partially embrace a section of the adjacent conduit.

3. A conduit assembly comprising superimposed courses of separate conduits, each course consisting of a row of individual and transversely spaced conduits and each such conduit consisting of a number of separate longitudinally alined sections; the joints between the sections of each conduit being transversely offset from those of an adjacent conduit in the same row as well as from the joints of the sections of the other course, and coupling collars about each conduit at the different section joints and connecting said sections together; each collar being arranged to partially embrace the adjacent conduits in the same row as well as the adjacent transversely alined conduits of the adjacent courses both above and below said collar.

In testimony whereof I affix my signature.

JOHN F. MAKOWSKI.